United States Patent
Weis et al.

(10) Patent No.: US 6,917,378 B2
(45) Date of Patent: Jul. 12, 2005

(54) METHOD OF OPERATING A DISPLAY SYSTEM IN A VEHICLE

(75) Inventors: Tim Weis, Bensheim (DE); Benno Tobias Schindler, Stolpen (DE)

(73) Assignee: Donnelly Hohe GmbH & Co., KG, Collenberg (DE)

(*) Notice: Subject to any disclaimer, the term of this patent is extended or adjusted under 35 U.S.C. 154(b) by 102 days.

(21) Appl. No.: 10/679,896

(22) Filed: Oct. 6, 2003

(65) Prior Publication Data

US 2004/0201671 A1 Oct. 14, 2004

(30) Foreign Application Priority Data

Oct. 7, 2002 (DE) ......................................... 102 46 652

(51) Int. Cl.[7] ............................ H04N 7/18; B60G 1/48
(52) U.S. Cl. ..................... 348/113; 348/148; 340/932.2
(58) Field of Search ................ 348/113, 119, 348/148, 142; 340/932.2, 937; 701/28

(56) References Cited

U.S. PATENT DOCUMENTS

| | | | |
|---|---|---|---|
| 6,169,572 B1 | 1/2001 | Sogawa | |
| 6,657,555 B2 * | 12/2003 | Shimizu et al. | 340/932.2 |
| 2001/0017591 A1 | 8/2001 | Kuriya et al. | |
| 2001/0026317 A1 | 10/2001 | Kakinami et al. | |
| 2001/0030688 A1 * | 10/2001 | Asahi et al. | 348/118 |
| 2002/0041239 A1 | 4/2002 | Shimizu et al. | |
| 2002/0075387 A1 | 6/2002 | Janssen | |
| 2002/0084916 A1 | 7/2002 | Shimizu et al. | |
| 2003/0045973 A1 * | 3/2003 | Okamoto | 701/1 |
| 2003/0122687 A1 * | 7/2003 | Trajkovic et al. | 340/932.2 |
| 2005/0033495 A1 * | 2/2005 | Tanaka et al. | 701/36 |

FOREIGN PATENT DOCUMENTS

| | | |
|---|---|---|
| DE | 197 41 896 | 4/1999 |
| DE | 100 65 327 | 8/2001 |
| DE | 101 09 350 | 9/2001 |
| DE | 197 23 963 | 9/2001 |
| DE | 101 09 680 | 10/2001 |
| DE | 101 36 410 | 2/2002 |
| DE | 100 45 616 | 3/2002 |
| DE | 100 59 315 | 6/2002 |
| DE | 101 61 316 | 7/2002 |

* cited by examiner

Primary Examiner—Vu Le
(74) Attorney, Agent, or Firm—McGlew and Tuttle, P.C.

(57) ABSTRACT

A method is disclosed for operating a display system in a vehicle (01), having at least one camera, using which an observation region (02) in the surroundings of the vehicle (01) may be recorded, having an image processing unit, in which the image data coming from the camera may be processed, a display screen (05) inside the vehicle, on which the image data coming from the image processing unit may be displayed as an image (07), and a sensor system, using which the vehicle movement may be detected and relayed as movement data to the image processing unit. In this case, at a starting instant, a vehicle position is determined as a starting point, the vehicle (01) is moved further, beginning from the starting point, the rotational angle of the vehicle (01) around its vertical axis is detected by the sensor system, beginning from the orientation in the starting point, and the image data coming from the camera is processed in the image processing unit, taking the respective current rotational angle of the vehicle into consideration, in such a way that the orientation of objects (03, 04, 03a, 04a, 04b, 04c) from the observation region (02) displayed in the image (07) on the display screen (05) corresponds to the orientation at the starting instant.

15 Claims, 8 Drawing Sheets

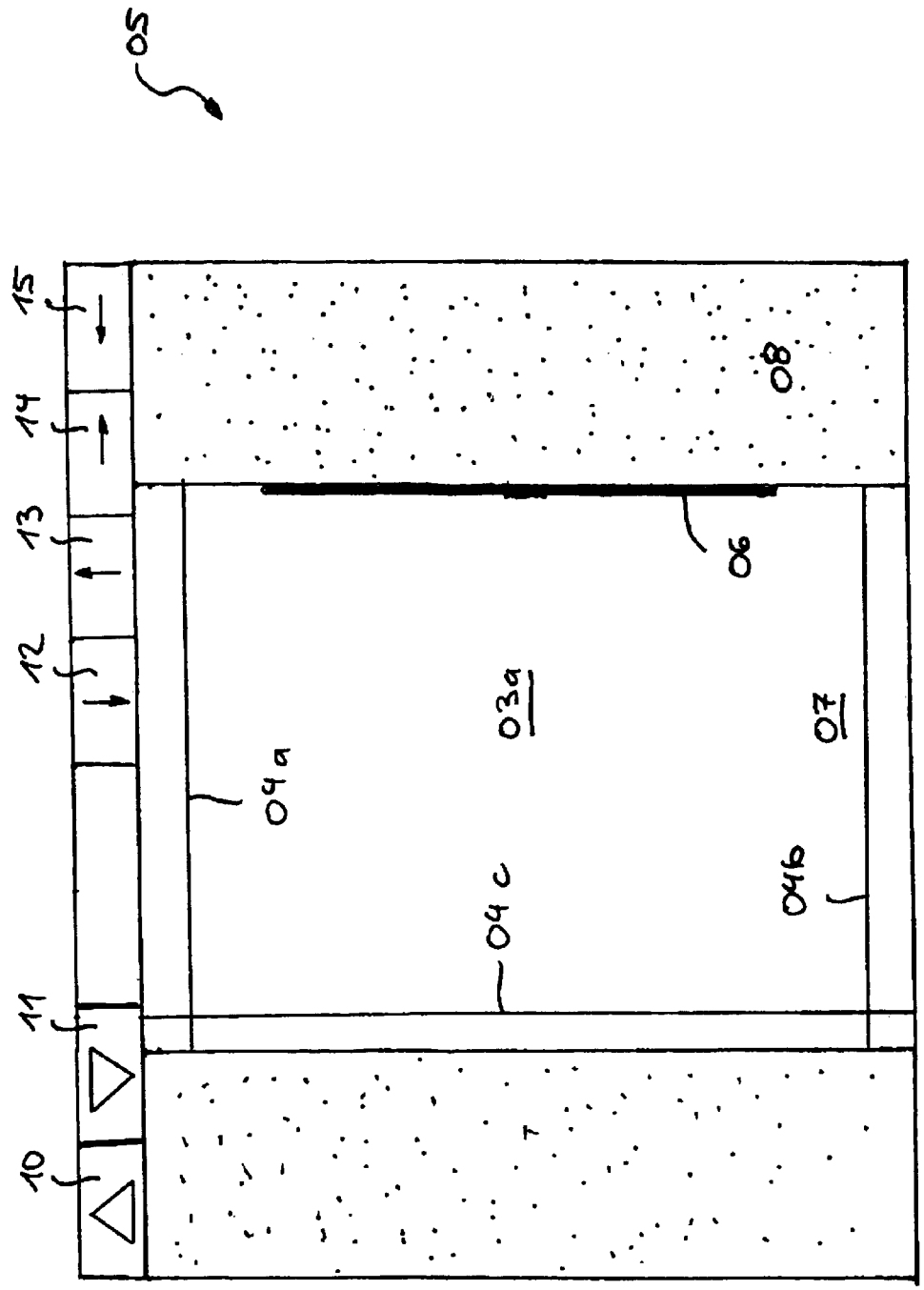

METHOD OF OPERATING A DISPLAY SYSTEM IN A VEHICLE

FIELD OF THE INVENTION

The invention relates to display systems for vehicles, having a camera, an image processing unit, a display screen positioned inside the vehicle, and a sensor system for detecting the movement data of the vehicle, are known from the related art.

BACKGROUND OF THE INVENTION

German Patent Application 100 45 616 A1 describes a display system of this type which is to assist the driver, particularly during parking.

A large problem in the use of known display systems is that the camera provided for recording moves with the vehicle. I.e., the driver is shown live images on the display screen which correspond to the current position of the camera, which is positioned, for example, on the rear of the vehicle. Due to this continuous change of the camera viewpoint together with the vehicle, the interpretation of the images displayed is made more difficult for the driver, through which the assistance of the driver by display systems according to this type, particularly during parking, is significantly restricted.

SUMMARY OF THE INVENTION

The object of the present invention is therefore to provide a method of operating a display system in a vehicle, through which the interpretation of the images displayed is made easier for the driver.

According to the invention, a method of operating a display system is provided in a vehicle is having at least one camera. The camera can be used for recording an observation region in the surroundings of the vehicle. The system has an image processing unit, in which the image data coming from the camera may be processed and a display screen inside the vehicle, on which the image data coming from the image processing unit may be displayed as an image. A sensor system is employed for detecting vehicle movement and relaying as movement data to the image processing unit. The method includes the steps:

at a starting instant, a vehicle position is determined as a starting point;

the vehicle is moved further, beginning from the starting point;

the rotational angle of the vehicle around its vertical axis is detected by the sensor system, beginning from the orientation at the starting point;

the image data coming from the camera is processed in the image processing unit, taking into consideration the respective current rotational angle of the vehicle, in such a way that the orientation of objects from the observation region displayed in the image on the display screen corresponds to the orientation at the starting instant.

The present invention is based on the basic idea that the driver is no longer displayed the current live images recorded by the camera, but rather the image data of these live images is suitably preprocessed in an image processing unit. The preprocessing of the image data in the image processing unit is used in this case so that the orientation of the objects displayed on the display screen, particularly marking lines, curbstones, or other vehicles, always corresponds to the orientation at the starting instant. In other words, this means that the driver has the ability, through the achievement of the method according to the present invention, to always have the image data recorded by the camera displayed in a rotation-free representation. According to the present invention, the rotational angle of the motor vehicle around its vertical axis, beginning from the orientation in the starting point, is detected by a suitable sensor system, for example a steering-angle sensor in combination with a speed sensor and a timekeeping unit, and the image data recorded by the camera is processed in the image processing unit in such a way that the images displayed are always rotated diametrically opposed by precisely the angle around which the vehicle has rotated, beginning from the starting point.

As a result, through the method according to the present invention, the driver is displayed images on the display screen which correspond to a fixed observation point outside the vehicle.

In order to be able to display the largest possible observation region in the surroundings of the vehicle, it is particularly advantageous if the image data of multiple cameras may be mixed together in the image processing unit and combined into a joint image. For example, it is conceivable for two video cameras, particularly CCD cameras, to be positioned on the rear of the vehicle, one camera observing the region left of center and the center and the other camera observing the region right of center and the center. The image data of both cameras may then be mixed in order to be able to display one single image having a correspondingly enlarged observation region.

Alternatively to this method and/or as an addition thereto, wide angle lenses may be provided on the cameras, in order to enlarge the observation region. Since distortion of straight lines is produced by the wide angle lenses, which in turn makes interpretation of the images displayed more difficult for the driver, a processing step may also be performed in the image processing unit, through which the distortions produced by the wide angle lenses may be removed again using computers.

In addition to the derotation of the images displayed on the display screen according to the present invention, the interpretation may also be made easier for the driver if the image data is processed in the image processing unit in such a way that the image displayed on the display screen corresponds to a perspective outside the vehicle, particularly a top view from above the vehicle. Suitable methods for converting an image into a top view are known, for example, from German Patent 197 41 896. By combining the derotation according to the present invention and the display from the perspective above the vehicle, the driver obtains images displayed on the display screen which correspond to a fixed observation point above the vehicle. This display method is extremely compliant with the human visualization ability, so that the driver receives a good orientation aid, particularly during backwards parking.

In the display systems according to this type (vehicle display systems), the observation region recordable by the camera is, as a rule, essentially rectangular, the ratio of height and width of the observation region corresponding to the ratio of height and width of the display screen, so that normally the entire observation region may be displayed on the display screen. If, according to the present invention, the image data is displayed on the display screen in such a way that the observation region is displayed so that the rotation of the vehicle around its vertical axis is removed using computers, it follows that the size of the displayable observation region necessarily no longer corresponds to the size of the display screen. This is because, through the method according to the present invention, the displayed observation region must be pivoted around the angle around which the vehicle has rotated around the vertical axis since the starting instant. As a function of the requirements of the respective driving situation, it is therefore necessary to suitably reduce the observation region displayed on the display screen by a reduction factor.

In particular, it is conceivable that the reduction factor is selected as a function of the rotational angle of the vehicle since the starting instant in such a way that the entire observation region of the camera may be displayed on the display screen. In this case, the entire display screen is necessarily not used to display the observation region, the displayed observation region simultaneously being reduced. With this procedure, however, it is always ensured that the driver is displayed all image information which is recorded by the cameras.

As an alternative to displaying the entire observation region recordable by the camera, it is also conceivable for other reduction factors to be selected as a function of specific parameters, for example, the vehicle speed or the respective steering angle, so that only a slight reduction is necessary in this case, however, the corners of the observation region recordable by the camera not being displayed on the display screen.

In specific driving situations, image information from very specific regions of the observation region is of particular interest to the driver. According to the present invention, specific image details from the observation region may be zoomed in on during display on the display screen by selecting a corresponding zoom factor. I. e., depending on the selection of the zoom factor, the entire observation region is no longer displayed on the display screen, but rather an enlarged detail therefrom.

According to a preferred embodiment, it is also possible in this case to change the position of the zoomed image detail in relation to the boundaries of the observation region. I. e., the zoomed image detail may be displaced forward, back, right, and left in relation to the boundaries of the observation region, so that as a result, an image detail which is arbitrarily selectable in its size and position is displayable.

According to the present invention, the way in which the zoom factor is selected is basically arbitrary. According to a first embodiment of the present invention, the operator has the ability to manually set the zoom factor and/or the position of the zoomed image detail. I. e., starting from the respective image displayed, the driver may zoom in and out on the image displayed by operating corresponding suitable operating elements, for example, pushbuttons, and in this way additionally displace the image detail displayed forward, back, left, or right within the boundaries of the observation region.

As an alternative to manual selection of the zoom factor, it is also conceivable that the zoom factor and/or the position of the zoomed image detail is performed automatically by the image processing unit as a function of other state parameters.

The method according to the present invention is described for exemplary purposes in the following with reference to the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 5 is a view from above from the vehicle shown in FIG. 1 in a third driving situation in;

FIG. 8 is the image which is recorded in the driving situation shown in FIG. 7 displayed on the display screen in the zoomed image detail.

DESCRIPTION OF THE PREFERRED EMBODIMENT

Figure 1:
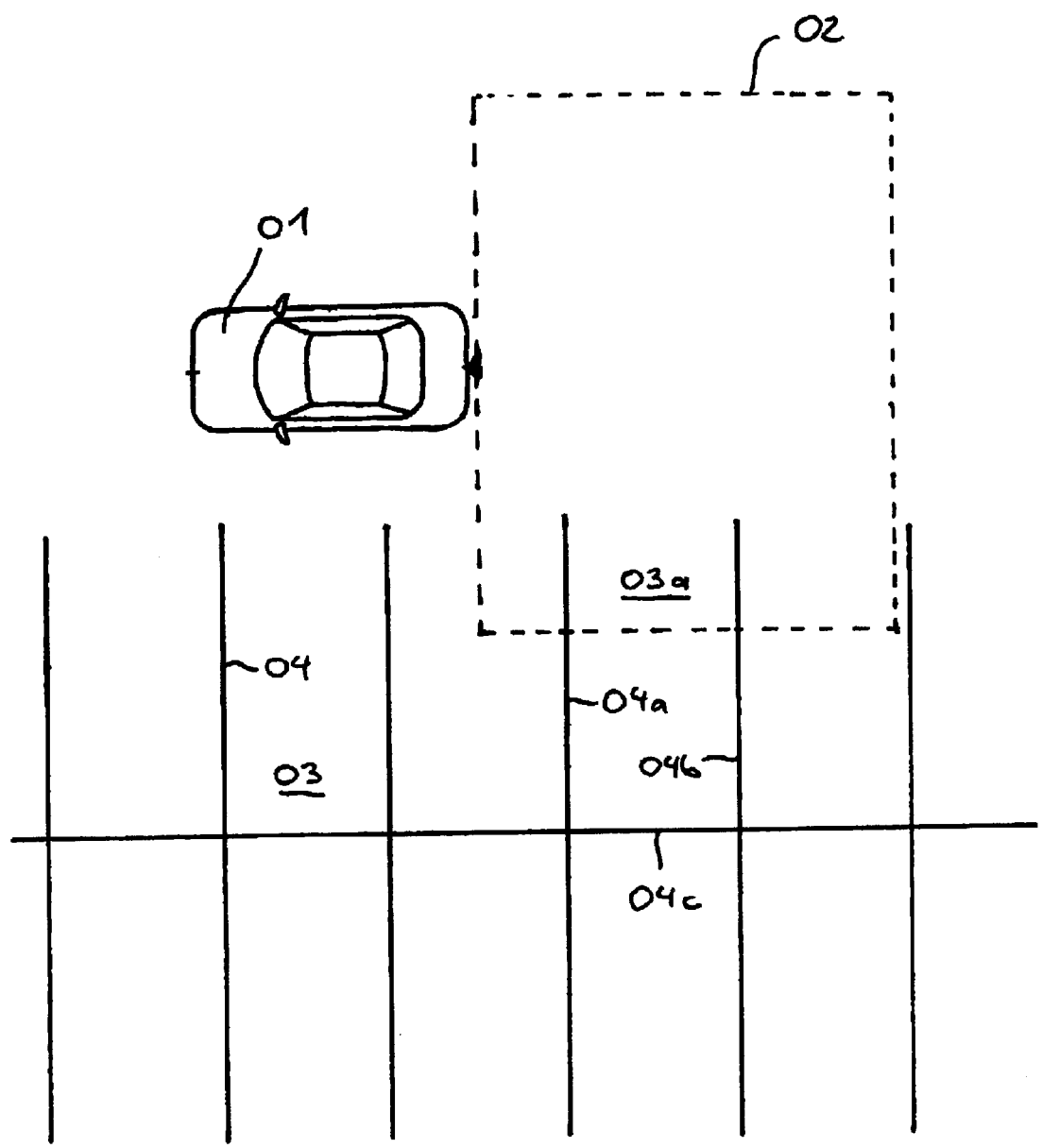
FIG. 1 is a schematic illustration of a vehicle in a first driving situation (starting instant) in a view from above.

Referring to the drawings in particular, FIG. 1 illustrates a vehicle 01 in a first driving situation, specifically while looking for a parking place, in a view from above. Vehicle 01 is equipped with two cameras, which are positioned on the rear of the vehicle and using which an observation region 02 behind vehicle 01, indicated by dashed lines in FIG. 1, may be recorded. Multiple parking bays (parking spots) 03 are located to the left of vehicle 01, which are delimited by marking stripes 04 applied to the ground.

If the driver now wishes to park vehicle 01 in a parking bay 03a, the driver is assisted in the way according to the present invention by the display system provided on the vehicle 01, having cameras, image processing unit, display screen inside the vehicle, and sensor system for detecting the vehicle movement data. The driving situation illustrated in FIG. 1 represents the starting instant of the parking procedure, in which the vehicle assumes a position which corresponds to the desired starting point.

Figure 2:
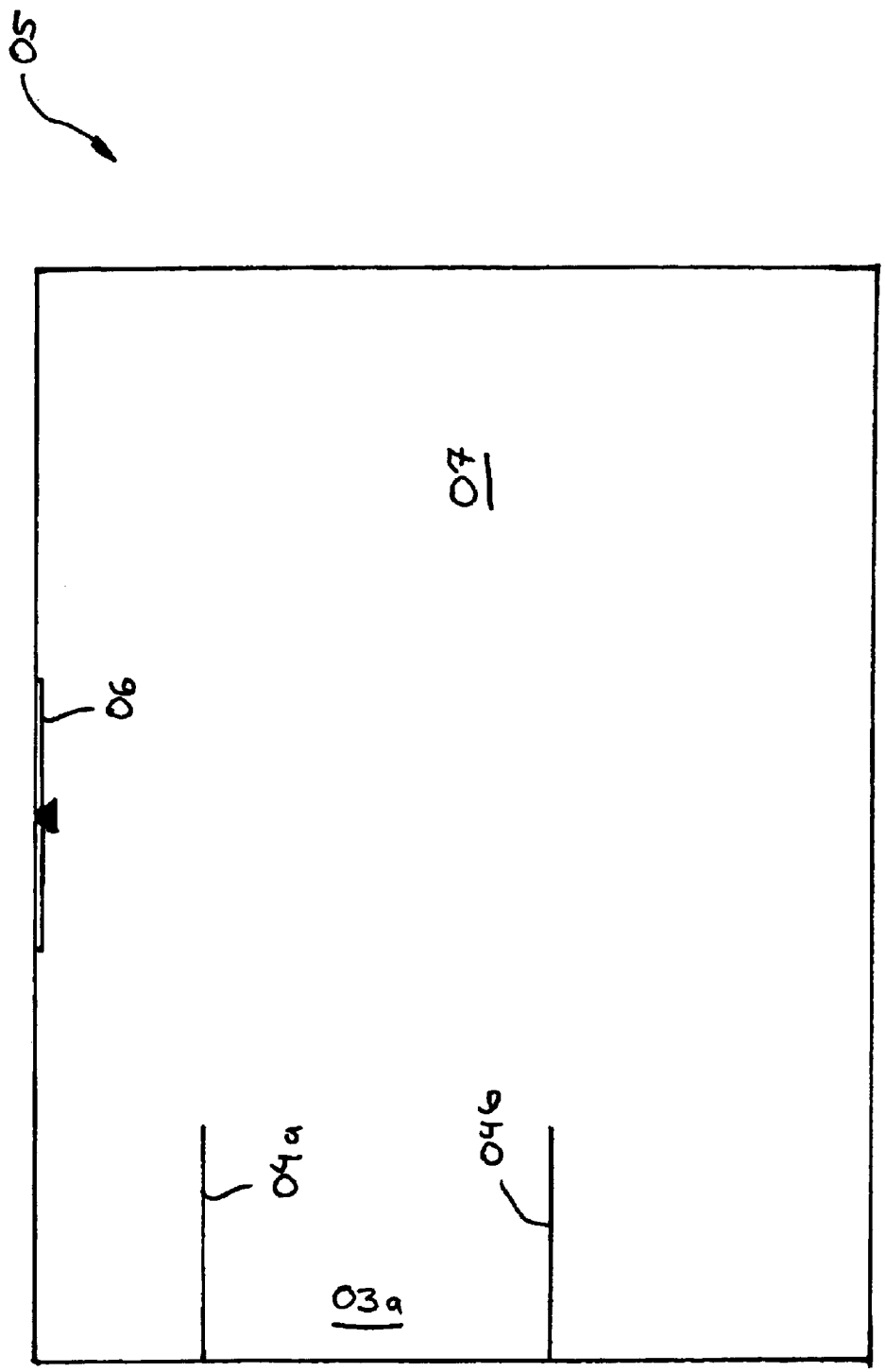
FIG. 2 is an image which is recorded in the driving situation shown in FIG. 1 displayed on the display screen in the vehicle.

A display screen 05 is schematically illustrated in FIG. 2, on which observation region 02 is displayed in the starting instant by an image 07. At the upper edge of display screen 05, the rear of vehicle 01 is inserted into the live image as a schematic symbol 06. The other objects displayed on display screen 05 correspond to the situation which is recorded by the cameras at the rear of the vehicle at the corresponding instant. In particular, marking stripes 04a and 04b, which delimit parking bay 03a to be steered into and whose ends extend into observation region 02 (see FIG. 1), are displayed to the driver on display screen 05. If the driver now wishes to park in parking bay 03a delimited by marking stripes 04a and 04b, the driver initiates the image processing method according to the present invention by operating a suitable operating element, for example a pushbutton.

Figure 3:
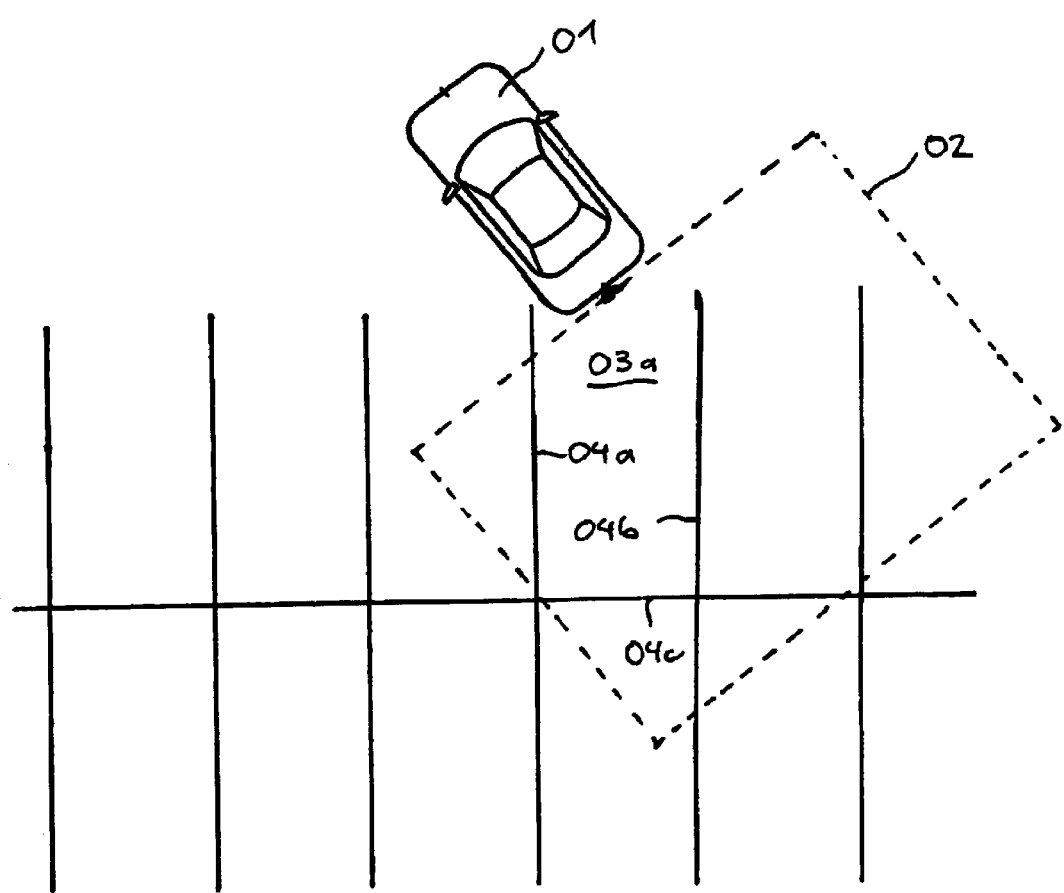
FIG. 3 is a view from above the vehicle shown in FIG. 1, in a second driving situation.

In FIG. 3, a second driving situation with vehicle 01 is illustrated, in which vehicle 01, beginning from the first driving situation (see FIG. 1), has already approached parking bay 03a. During the vehicle movement to approach parking bay 03a, the vehicle has rotated by approximately 45° around its vertical axis, so that a correspondingly changed part of the surrounding region is recorded in observation region 02 by the cameras.

Figure 4:
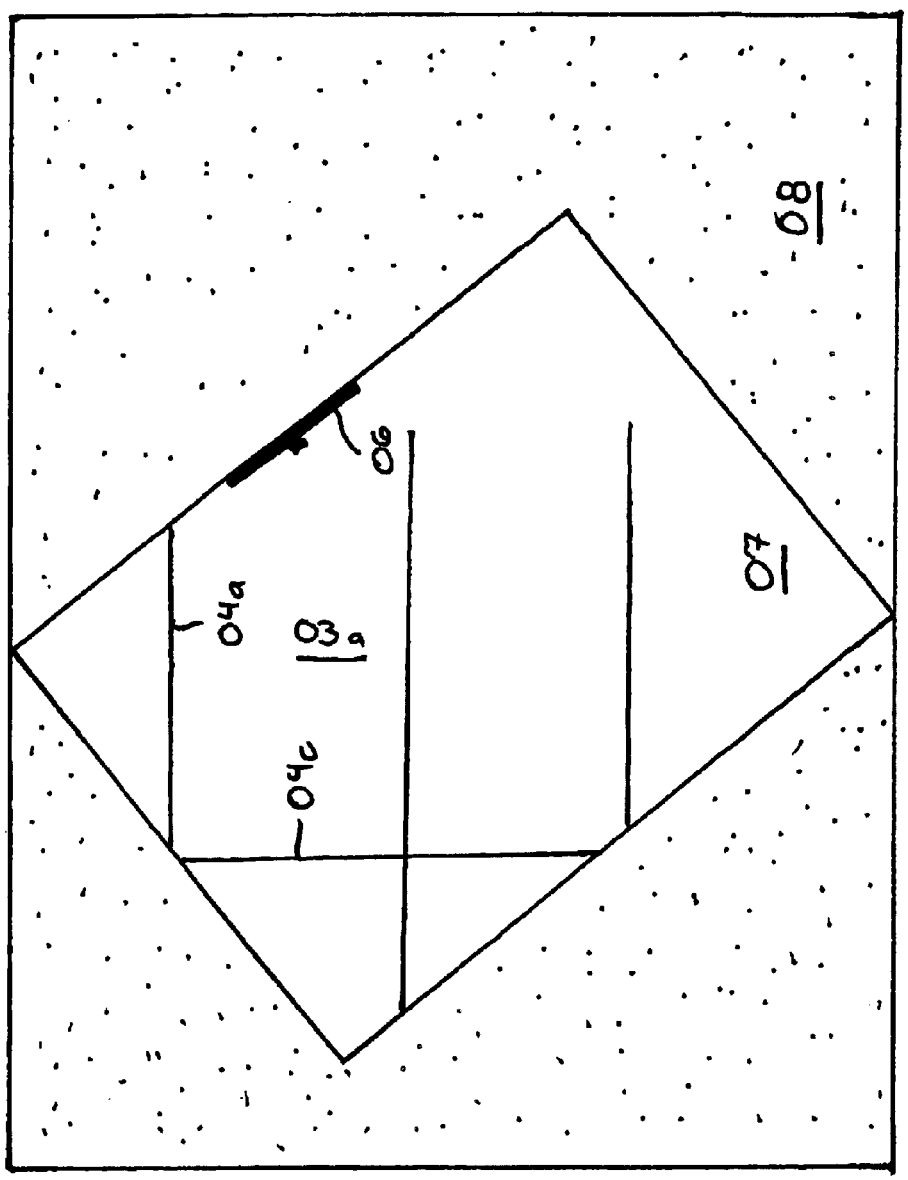
FIG. 4 is the image which is recorded in the driving situation shown in FIG. 3 displayed on the display screen.

In FIG. 4, display screen 05 is shown while displaying the second driving situation (see FIG. 3). It may be seen that the orientation of marking stripes 04a and 04b relative to display screen 05 corresponds to the orientation at the starting instant (see FIG. 2), in spite of the intrinsic movement of vehicle 01. I. e., marking stripes 04a and 04b still run, in spite of the intrinsic movement of vehicle 01, essentially horizontally in image 07, which corresponds to the orientation of marking stripes 04a and 04b at the starting instant. During the processing of the image data recorded by the cameras in the image processing unit, the image data is converted in such a way that a perspective which corresponds to a top view from above the vehicle is displayed for the driver. In addition, distortions which arise due to the wide angle lenses provided on the cameras are removed using computers, so that straight marking stripes 04 are also displayed as straight lines on display screen 05.

In order that entire observation region 02 may also be displayed in the second driving situation (see FIG. 3), in which observation region 02 has pivoted by approximately 45° in relation to the fixed objects in the vehicle surroundings, image 07 displayed on display screen 05 is correspondingly reduced. I. e., image 07 no longer fills up entire display screen 05, but rather is enclosed by a blackened display screen region 08. This effect of incomplete use of display screen 05 during use of the method according to the present invention may be avoided by using circular display screens and selecting a circular observation region.

Figure 5:
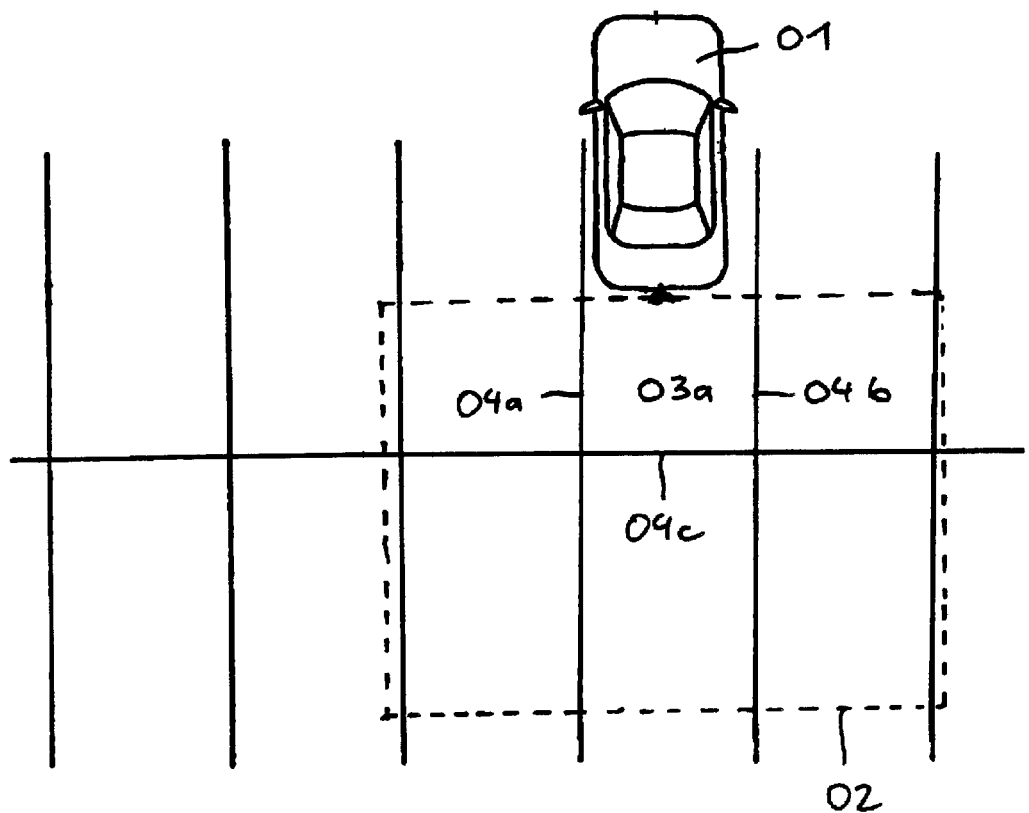

FIG. 5 illustrates vehicle 01 in a third driving situation, in which vehicle 01 has already completely reached parking bay 03a and must only move straight backward to arrive at the final position. The ends of marking stripes 04a and 04b have already moved out of observation region 02 and therefore may no longer be displayed on display screen 05.

Figure 6:
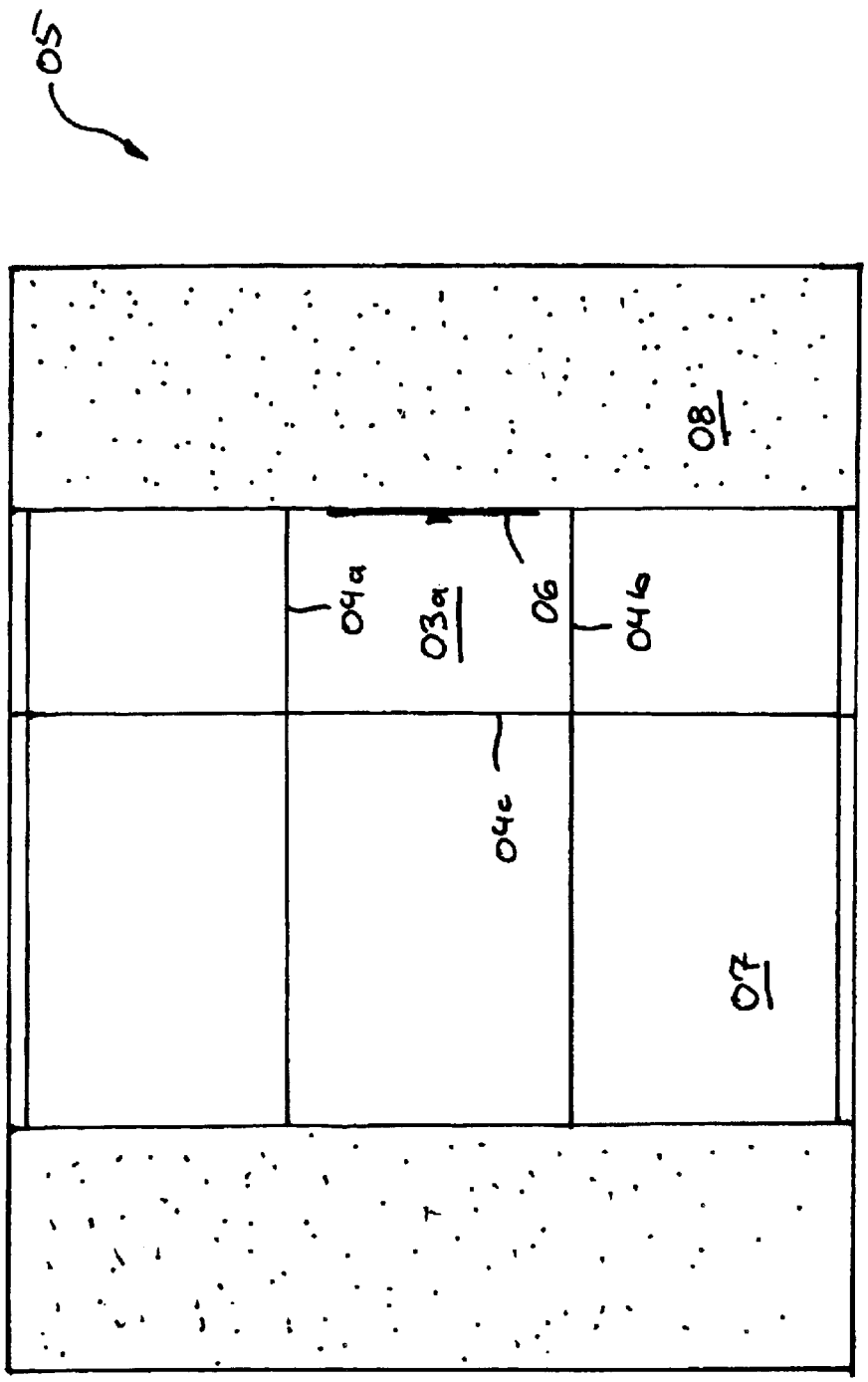
FIG. 6 is the image which is recorded in the driving situation shown in FIG. 5 displayed on the display screen.

FIG. 6 illustrates the display of image 07 on display screen 05 during the third driving situation (see FIG. 5). Marking stripes 04a and 04b again run horizontally over image screen 05. Since observation region 02 is now positioned perpendicularly to the original orientation in the starting point, the reduction factor for reducing image 07 may be increased again to in comparison to the second driving situation, since now the entire height of image 05 is available for displaying image 07.

Figure 7:
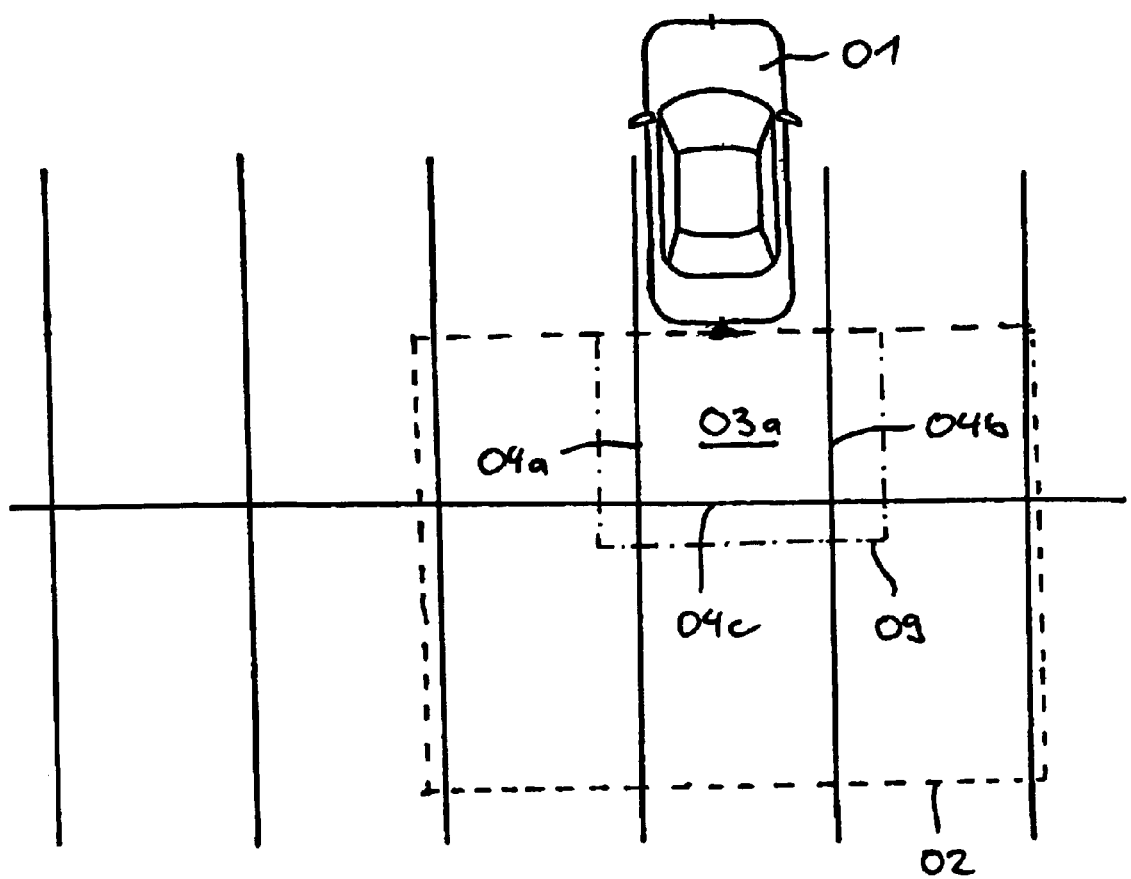
FIG. 7 is a view showing the same driving situation as shown in FIG. 5, with an additional image detail in the observation region for zoom display.

In FIG. 7, the third driving situation corresponding to FIG. 5 is illustrated once again, the driver having selected an image detail 09 in observation 15 region 02 to be zoomed in on by operating corresponding operating elements. During the selection of image detail 09, the driver may determine the size of image detail 09 and its relative position to the boundaries of observation region 02 to the front, back, right, and left.

FIG. 8 shows display screen 05 while displaying the image data from zoomed image detail 09. Symbol 06 for indicating vehicle 01 in display screen 05 is enlarged in accordance with the zoom factor selected. By operating buttons 10 and 11, the driver may increase and/or reduce the zoom factor, in order to change the size of image detail 09 to be displayed on display screen 05. By operating buttons 12, 13, 14, and 15, the driver may displace zoomed image detail 09 to the front, back, right, and left within the boundaries of observation region 02. As a result, the driver has the ability to have image detail 09 from observation region 02 which he requires for dealing with the current driving situation, for 30 example during backward parking, displayed on display screen 05 at any time. Parts of the observation region which are not of interest to the driver may be hidden in this way. The zooming for displaying image detail 09 is not performed by adjusting the focus of the camera lens, but by selecting the image data in the image processing unit.

While specific embodiments of the invention have been shown and described in detail to illustrate the application of the principles of the invention, it will be understood that the invention may be embodied otherwise without departing from such principles.

What is claimed is:

1. A method of operating a display system in a vehicle having at least one camera for recording an observation region in the surroundings of the vehicle, having an image processing unit, in which the image data coming from the camera may be processed, having a display screen inside the vehicle, on which the image data coming from the image processing unit may be displayed as an image and having a sensor system for detecting the vehicle movement and relaying movement data to the image processing unit, the method comprising the steps of:

at a starting instant, determining a vehicle position as a starting point;

moving the vehicle from the starting point;

detecting the rotational angle of the vehicle around its vertical axis using the sensor system, beginning from the orientation at the starting point;

processing the image data coming from the camera in a image processing unit, taking into consideration the respective current rotational angle of the vehicle, in such a way that the orientation of objects from the observation region displayed in the image on the display screen corresponds to the orientation at the starting instant.

2. The method according to claim 1, wherein the image data of multiple cameras is mixed together in the image processing unit, in order to generate a joint image from the image data to be displayed on the display screen.

3. The method according to claim 1, wherein the camera is equipped with a wide angle lens and the image distortions caused by the wide angle lens are at least partially removed by processing the image data in the image processing unit.

4. The method according to claim 1, wherein the observation region of the camera lies behind the rear of the vehicle.

5. The method according to claim 1, wherein the image data is processed in the image processing unit in such a way that the image displayed on the display screen corresponds to a perspective outside the vehicle.

6. The method according to claim 1, wherein for the display of the image on the display screen, a reduction factor is set, as a function of the rotational angle of the vehicle in relation to the starting position, for the display of the image imaging the observation region on the display screen.

7. The method according to claim 6, wherein the reduction factor is selected in such a way that the entire observation region is shown by the image on the display screen.

8. The method according to claim 1, wherein specific image details from the observation region may be zoomed in on during the display on the display screen by selecting a corresponding zoom factor.

9. The method according to claim 8, wherein the position of the zoomed image detail in relation to the boundaries of the observation region may be changed.

10. The method according to claim 9, wherein the selection of the position of the zoomed image detail is performed by a setting of the operator.

11. The method according to claim 8, wherein the selection of the zoom factor is performed by a setting of the operator.

12. The method according to claim 9, wherein the selection of the position of the zoomed image detail is performed automatically by the image processing unit as a function of other state parameters.

13. The method according to claim 8, wherein the selection of the zoom factor is performed automatically by the image processing unit as a function of other state parameters.

14. The method according to claims 1, wherein a symbol, representing the position of the vehicle in the image is inserted into the image on the display screen.

15. The method according to claim 1, wherein the image data is processed in the image processing unit in such a way that the image displayed on the display screen corresponds to a top view from above the vehicle.

* * * * *